US007726855B2

(12) United States Patent
Nakada et al.

(10) Patent No.: US 7,726,855 B2
(45) **Date of Patent: *Jun. 1, 2010**

(54) LAMP UNIT OF VEHICLE HEADLAMP

(75) Inventors: Yusuke Nakada, Shizuoka (JP); Michio Tsukamoto, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 29 days.

This patent is subject to a terminal disclaimer.

(21) Appl. No.: 12/054,943

(22) Filed: Mar. 25, 2008

(65) Prior Publication Data

US 2008/0239740 A1 Oct. 2, 2008

(30) Foreign Application Priority Data

Mar. 26, 2007 (JP) ............................ 2007-079029

(51) Int. Cl.
*B60Q 1/00* (2006.01)

(52) U.S. Cl. ........................ 362/507; 362/516; 362/538

(58) Field of Classification Search ................. 362/507, 362/538, 389, 545, 516, 517, 518, 520, 521, 362/522

See application file for complete search history.

(56) References Cited

U.S. PATENT DOCUMENTS 4,686,610 A * 8/1987 Cibie et al. ................. 362/517
5,526,248 A * 6/1996 Endo .......................... 362/538
5,967,647 A 10/1999 Eichler
6,543,910 B2 * 4/2003 Taniuchi et al. ............. 362/297
7,341,366 B2 * 3/2008 Iwasaki ...................... 362/538
2006/0274544 A1 12/2006 Inoue et al.

FOREIGN PATENT DOCUMENTS

DE 19704467 A1 8/1998
DE 102006025997 A1 12/2006

(Continued)

OTHER PUBLICATIONS

Patent Abstracts of Japan, Publication No. 2006-335328 dated Dec. 14, 2006, 2 pages.

(Continued)

*Primary Examiner*—Gunyoung T Lee
(74) *Attorney, Agent, or Firm*—Osha • Liang LLP

(57) ABSTRACT

A lamp unit of a vehicle lamp includes a projection lens arranged on an optical axis extending in the longitudinal direction of a vehicle, a light-emitting element arranged so as to face upward behind a rear focal point of the projection lens and in the vicinity of the optical axis, and a reflector arranged so as to cover the light-emitting element from above and to reflect the light from the light-emitting element forward toward the optical axis. The light-emitting element has a plurality of light-emitting chips arranged so as to be adjacent to each other in a vehicle width direction. A mirror member is provided between the reflector and the projection lens. The mirror member includes an upward reflecting surface that upward reflects a portion of the reflected light from the reflector. A diffusing and reflecting portion that diffuses and reflects the reflected light from the reflector is formed in the upward reflecting surface so as to bridge over the optical axis in the vehicle width direction.

8 Claims, 7 Drawing Sheets

FOREIGN PATENT DOCUMENTS

JP 2006-335328 12/2006

OTHER PUBLICATIONS

German Office Action for Application No. 10 2008 015 509.8-54, mailed on Jul. 23, 2009 (4 pages).

esp@cenet Patent Abstract for German Publication No. 10 2006 025 997, publication date Dec. 14, 2006. (1 page).

esp@cenet Patent Abstract for German Publication No. 197 04 467, publication date Aug. 13, 1998. (1 page).

* cited by examiner

LAMP UNIT OF VEHICLE HEADLAMP

This application claims foreign priority from Japanese Patent Application No. 2007-079029 filed on Mar. 26, 2007, the entire contents of which are hereby incorporated by reference.

BACKGROUND OF THE INVENTION

1. Field of the Invention

The present invention relates to a lamp unit of a vehicle headlamp, and particularly, relates to a projector-type lamp unit that uses a light-emitting element as a light source.

2. Related Art

In recent years, even in vehicle headlamps, lamp units that use a light-emitting element, such as a light-emitting diode, as a light source have been adopted.

For example, Patent Document 1 discloses a so-called projector-type lamp unit including a projection lens arranged on an optical axis extending in the longitudinal direction of a vehicle, a light-emitting element arranged so as to face upward behind a rear focal point of the projection lens and in the vicinity of the optical axis, and a reflector arranged so as to cover the light-emitting element from above and to reflect the light from the light-emitting element forward toward the optical axis.

In such a case, in the lamp unit disclosed in Patent Document 1, a mirror member that has an upward reflecting surface that upward reflects a portion of the reflected light from the reflector is provided between the reflector and the projection lens, and a light-emitting element that has a plurality of light-emitting chips arranged so as to be adjacent to each other in the vehicle width direction is used as the above light-emitting element.

[Patent Document 1] JP-A-2006-335328

In the projector-type lamp unit provided with a mirror member as disclosed in the above Patent Document 1, the utilization efficiency of the light from the light-emitting element can be enhanced, and thereby the brightness of a light distribution pattern can be formed sufficiently.

However, in the projector type lamp unit, a light source image formed on the rear focal plane of the projection lens is projected onto a virtual vertical screen ahead of the lamp as an inverted image. Thus, when a light-emitting element having a plurality of light-emitting chips arranged so as to be adjacent to each other in the vehicle width direction is used as the light source, a light source image formed by the reflected light from a central reflection region close to and just above the optical axis in the reflector has a gap between the light-emitting chips. Because of this, there is a problem in that the gap may be projected as a longitudinally striped dark portion, and thereby light distribution unevenness may be caused in a light distribution pattern.

SUMMARY OF THE INVENTION

One or more embodiments of the invention to provide a lamp unit of a vehicle headlamp capable of suppressing occurrence of light distribution unevenness irrespective of whether a light-emitting element is configured to have a plurality of light-emitting chips arranged so as to be adjacent to each other in a vehicle width direction when a projector-type lamp unit that uses the light-emitting element as a light source is adopted as the lamp unit of a vehicle headlamp.

One or more embodiments of the invention include a configuration in which a mirror member that upward reflects a portion of the reflected light from a reflector is provided.

The lamp unit of a vehicle lamp according to one or more embodiments of the invention comprises a projection lens arranged on an optical axis extending in the longitudinal direction of a vehicle, a light-emitting element arranged so as to face upward behind a rear focal point of the projection lens and in the vicinity of the optical axis, and a reflector arranged so as to cover the light-emitting element from above and to reflect the light from the light-emitting element forward toward the optical axis. The light-emitting element has a plurality of light-emitting chips arranged so as to be adjacent to each other in a vehicle width direction. A mirror member that has an upward reflecting surface that upward reflects a portion of the reflected light from the reflector is provided between the reflector and the projection lens. A diffusing and reflecting portion that diffuses and reflects the reflected light from the reflector is formed in the upward reflecting surface so as to bridge over the optical axis in the vehicle width direction.

A light distribution pattern formed by the light radiated from the lamp unit according to one or more embodiments of the invention is not particularly limited thereto, and the light distribution pattern may be a light distribution pattern for low beams, or may be a light distribution pattern for high beams.

The above "light-emitting element" means a light source in the shape of an element that has a light-emitting chip that surface-emit light substantially in the shape of a point. The type of the light-emitting element is not particularly limited. For example, a light emitting diode, a laser diode, etc. can be adopted. The "light-emitting element" has a plurality of light-emitting chips arranged so as to be adjacent to each other in the vehicle width direction, concrete configurations, such as the shape or size of each of the light-emitting chips, and the spacing between the light-emitting chips, are not limited particularly. Moreover, although the "light-emitting element" is arranged so as to face upward in the vicinity of the optical axis, the light-emitting element is not necessarily arranged so as to face vertically upward.

The diffusing and reflecting portion is not particularly limited in its concrete configuration and formation position so long as it is configured so as to diffuse and reflect the reflected light from a reflector.

The lamp unit of a vehicle headlamp according to one or more embodiments of the invention is constituted as a projector-type lamp unit that uses the light-emitting element as a light source. However, because the mirror member that has the upward reflecting surface that upward reflects a portion of the reflected light from the reflector is provided between the reflector and the projection lens, the utilization efficiency of the light from the light-emitting element can be enhanced. Further, because the light-emitting element includes a plurality of light-emitting chips, the light source luminous flux of the light-emitting element can be increased, and thereby the brightness of a light distribution pattern can be formed sufficiently.

Because the plurality of light-emitting chips are arranged so as to be adjacent to each other in the vehicle width direction, the light source images formed by the reflected light from the central reflection region close to and just above the optical axis in the reflector has a gap between the light-emitting chips. However, because the diffusing and reflecting portion that diffuses and reflects the reflected light from the reflector is formed in the upward reflecting surface of the mirror member so as to bridge over the optical axis in the vehicle width direction, a light source image formed by the light from the central reflection region of the reflector reflected by the diffusing and reflecting portion can block the gap between the light-emitting chips, thereby preventing the gap from being projected as a longitudinally striped dark portion. Accordingly, light distribution unevenness can be suppressed in a light distribution pattern.

As described above, according to one or more embodiments of the invention, when a projector-type lamp unit that uses the light-emitting element as a light source is adopted as the lamp unit of a vehicle headlamp, occurrence of light distribution unevenness can be suppressed even if the light-emitting element is configured to have a plurality of light-emitting chips arranged so as to be adjacent to each other in the vehicle width direction.

If the diffusing and reflecting portion is configured by forming a plurality of grooves extending in the longitudinal direction so as to be adjacent to one another in the vehicle width direction, the reflected light from each of the grooves can be made into horizontally diffused light. Because of this, a light distribution pattern formed by the light from the central reflection region of the reflector reflected by the diffusing and reflecting portion can be made into a laterally long light distribution pattern. This makes it possible to more effectively suppress occurrence of light distribution unevenness.

Because the grooves among the plurality of grooves that are in positions apart from the optical axis have the upward slopes whose height becomes gradually small toward directions away from the optical axis, the following operation effects can be obtained.

Because the reflected light from the reflector becomes the light that is directed toward a direction nearer the optical axis, the reflected light from the left reflection region of the reflector will enter mainly the grooves located on the left side of the optical axis, and the reflected light from the right reflection region of the reflector will enter mainly the grooves located on the right side of the optical axis. Because the grooves among the plurality of grooves that are in positions apart from the optical axis have the upward slopes whose height becomes gradually small toward directions away from the optical axis, the reflected light can be made to enter the projection lens irrespective of whether the reflected light becomes horizontally diffused light. Accordingly, the luminous flux of a light source can be utilized effectively.

The formation position of the "diffusing and reflecting portion" is not particularly limited as described above. In one or more embodiments, if the position of the front end edge of the diffusing and reflecting portion is set to the position of 1 to 4 mm from the rear focal point of the projection lens, the light that is directed to a relatively short-distance region (that is, a region where light distribution unevenness is conspicuous) in the frontal direction of a vehicle can be diffused. Thus, occurrence of light distribution unevenness can be suppressed effectively. Further, if the above mirror member is formed so that the front end edge of the upward reflecting surface thereof may pass through the rear focal point of the projection lens, it is possible to form a light distribution pattern for low beams that has cut-off lines as an inverted projection image of the front end edge at its upper end. However, if the position of the front end edge of the diffusing and reflecting portion is set to be the position of 1 to 4 mm from the rear focal point of the projection lens, the portion located ahead of the diffusing and reflecting portion in the upward reflecting region ensures the function as the upward reflecting surface. Thus, occurrence of light distribution unevenness can be suppressed while cut-off lines formed by the front end edge of the upward reflecting surface can be formed clearly.

Other aspects and advantages of the invention will be apparent from the following description, the drawings and the claims.

DETAILED DESCRIPTION OF THE EXEMPLARY EMBODIMENTS

Hereinafter, embodiments of the invention will be described with reference to the accompanying drawings.

Figure 1:
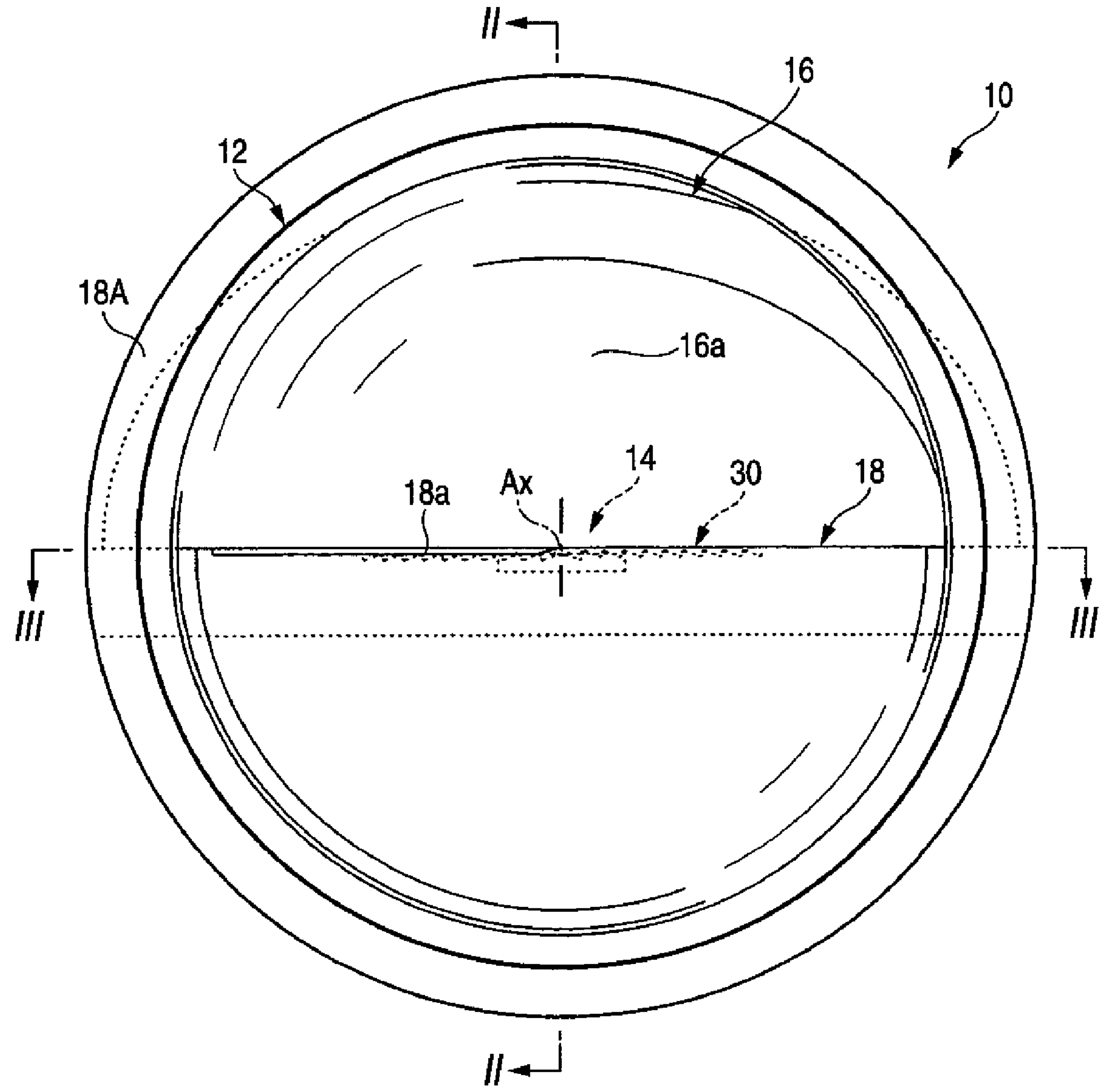
FIG. 1 is a front view showing a lamp unit of a vehicle headlamp according to one embodiment of the invention.
Figure 2:
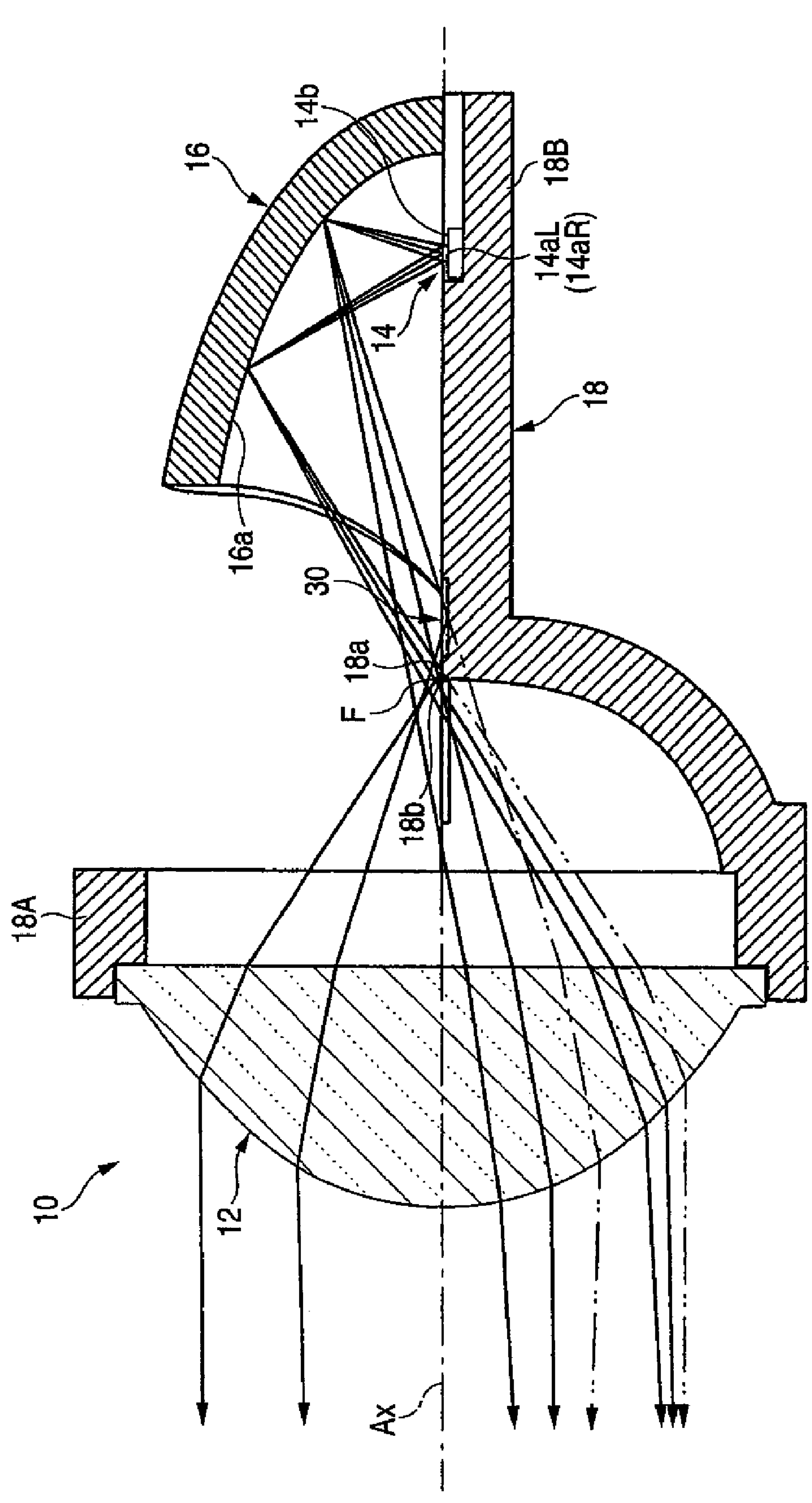
FIG. 2 is a sectional view taken along the line II-II of FIG. 1.

FIG. 1 is a front view showing a lamp unit 10 according to one embodiment of the invention. Further, FIG. 2 is a sectional view taken along the line II-II of FIG. 1, and FIG. 2 is a sectional view taken along the line III-III of FIG. 1.

As shown in these drawings, lamp unit 10 includes a projection lens 12 arranged on an optical axis Ax extending in the longitudinal direction of a vehicle, a light-emitting element 14 arranged behind a rear focal point F of the projection lens 12, a reflector 16 arranged so as to cover the light-emitting element 14 from above, and deflects the light from the light-emitting element 14 forward toward the optical axis Ax, and a mirror member 18 arranged between the reflector 16 and the projection lens 12, which reflects a portion of the reflected light from the reflector 16 upward.

The lamp unit 10 is adapted to be used in a state where it is incorporated as a portion of a vehicle headlamp. In the state where the lamp unit is incorporated into the vehicle headlamp, the lamp unit is arranged in a state where the optical axis Ax thereof extends in a downward direction of about 0.5 to 0.6° with respect to the longitudinal direction of a vehicle. Also, the lamp unit 10 performs optical irradiation for forming a light distribution pattern for low beams of left light distribution.

The projection lens 12 includes a planoconvex aspheric lens whose front surface is a convex surface and whose rear surface is a plane surface, and is adapted to project a light source image formed on a rear focal plane (that is, a focal plane including rear focal point F) onto a virtual vertical screen ahead of the lamp as an inverted image. The projection lens 12 is fixed to a ring-shaped lens holder 18A formed integrally with the mirror member 18 such that it is located ahead of the mirror member 18.

The light-emitting element 14 is a white light diode, and is composed of a pair of light-emitting chips 14*a*L and 14*a*R having an rectangular light-emitting surface with a size of about 1 mm×2 mm, and a substrate 14*b* that supports the pair of light-emitting chips 14*a*L and 14*a*R. Also, the light-emitting element 14 is positioned and fixed in a recessed portion formed in an upper surface of a rear extension portion 18B that is formed to extend rearward from the mirror member 18.

One pair of light-emitting chips 14*a*L and 14*a*R in the light-emitting element 14 are arranged such that their short sides faces each other, and each of the light-emitting chips

14*a*L and 14*a*R is sealed by a thin film formed so as to cover the light-emitting surface thereof. Also, the light-emitting element 14 is arranged such that both the light-emitting chips 14*a*L and 14*a*R face vertically upward, in a state where the pair of light-emitting chips 14*a*L and 14*a*R are adjacent to each other in the vehicle width direction, and in a state where the emission center (that is, the center of a gap G between both the light-emitting chips 14*a*L and 14*a*R) of both light-emitting chips 14*a*L and 14*a*R is located on the optical axis Ax.

A reflecting surface 16*a* of the reflector 16 is constituted with a curved surface substantially in the shape of an ellipsoid that has a major axis that is coaxial with the optical axis Ax, and uses the emission center of the light-emitting element 14 as a first focal point, and the eccentricity of the reflecting surface is set so as to increase gradually toward a horizontal cross section from a vertical cross section. Also, the reflecting surface 16*a* is configured so as to make the light from the light-emitting element 14 converge into a point located slightly ahead of the rear focal point F of the projection lens 12 in the vertical cross section, and to displace the converging position quite forward from the rear focal point F in the horizontal cross section. The reflector 16 is fixed to the upper surface of the rear extension portion 18B of the mirror member 18 at a peripheral lower end of the reflecting surface 16*a* thereof.

The mirror member 18 is constituted as a member in the shape of a substantially flat plate that extends in the horizontal direction, and the upper surface of the mirror member is constituted as an upward reflecting surface 18*a* extending rearward along the optical axis Ax from the rear focal point F. Also, the mirror member 18 reflects a portion of the reflected light from the reflector 16 upward in the upward reflecting surface 18*a* thereof. Further, the upward reflecting surface 18*a* is formed by performing specular processing by aluminum evaporation, etc. on the upper surface of the mirror member 18.

A front end edge 18*b* of the upward reflecting surface 18*a* is formed so as to extend along the rear focal plane of the projection lens 12. That is, the front end edge 18*b* is formed in a curved manner so as to be displaced gradually forward toward both sides of the optical axis Ax from the rear focal point F in plan view.

As for the upward reflecting surface 18*a*, a left region that is located on the left side (on the right side in the front view of the lamp) nearer the self-lane side than the optical axis Ax is constituted with a first horizontal plane 18*a*1 including the optical axis Ax, and a right region that is located on the right side nearer the opposite lane side than the optical axis Ax is constituted with a second horizontal plane 18*a*2 that is one-step lower than the left region via a middle slope 18*a*3 that extends obliquely downward from the optical axis.

The right end and the rear extension portion 18B that are sufficiently apart from the rear focal point F in the right region are formed so as to be flush with the first horizontal plane 18*a*1 that constitutes the left region. The downward inclination angle of the middle slope 18*a*3 is set to 150, and the second horizontal plane 18*a*2 is formed so as to be located about 0.4 mm below the first horizontal plane 18*a*1.

Figure 3:
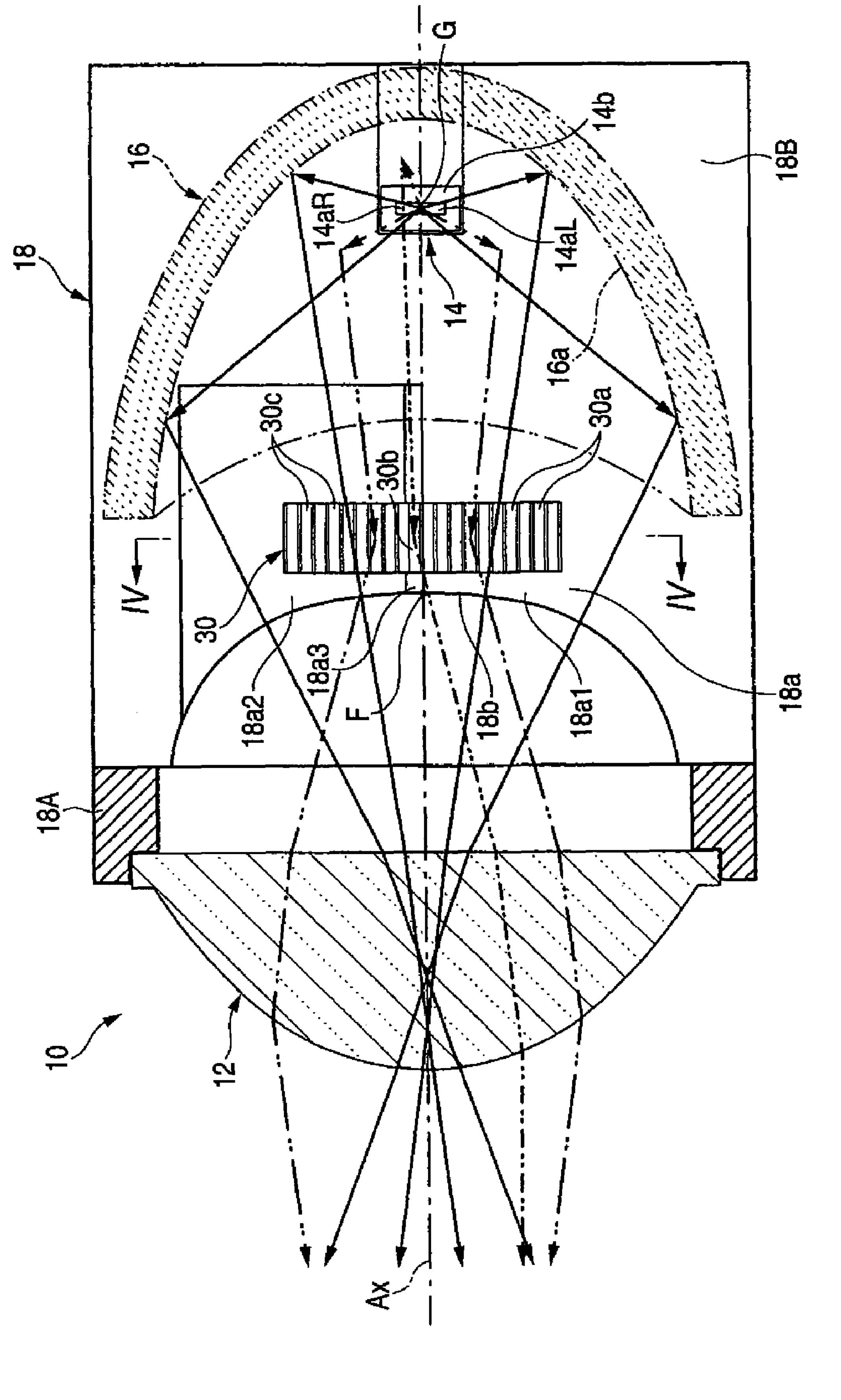
FIG. 3 is a sectional view taken along the line III-III of FIG. 1.

As shown in FIGS. 2 and 3, the light from the light-emitting element 14 reflected by the reflecting surface 16*a* of the reflector 16 is reflected forward toward the optical axis Ax and enters a lower region of the projection lens 12. A portion of the light enters the upward reflecting surface 18*a* of the mirror member 18, is reflected by the upward reflecting surface 18*a*, and then enters an upper region of the projection lens 12. Then, the light that has entered the lower region or upper region of the projection lens 12 is emitted forward as downward light from the projection lens 12.

Further, a diffusing and reflecting portion 30 that diffuses and reflects the reflected light from the reflector 16 is formed in a position that is apart rearward from the front end edge 18*b* in the upward reflecting surface 18*a*.

Figure 4:
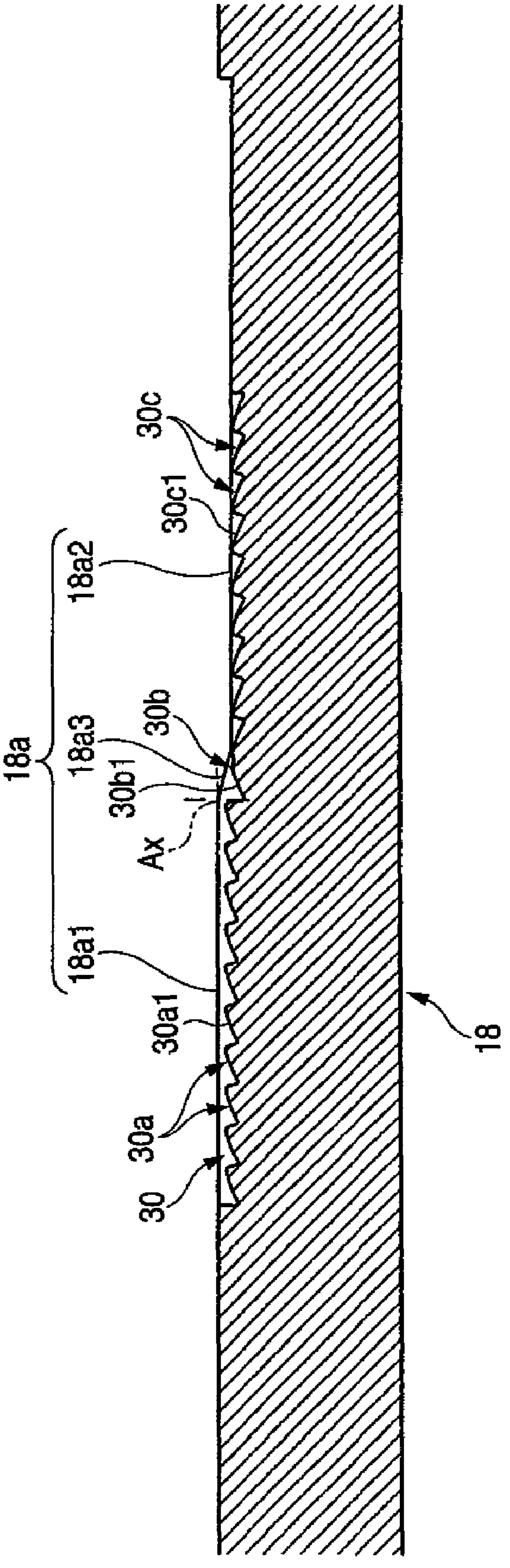
FIG. 4 is a detailed sectional view taken along the line IV-IV of FIG. 3.
Figure 5:
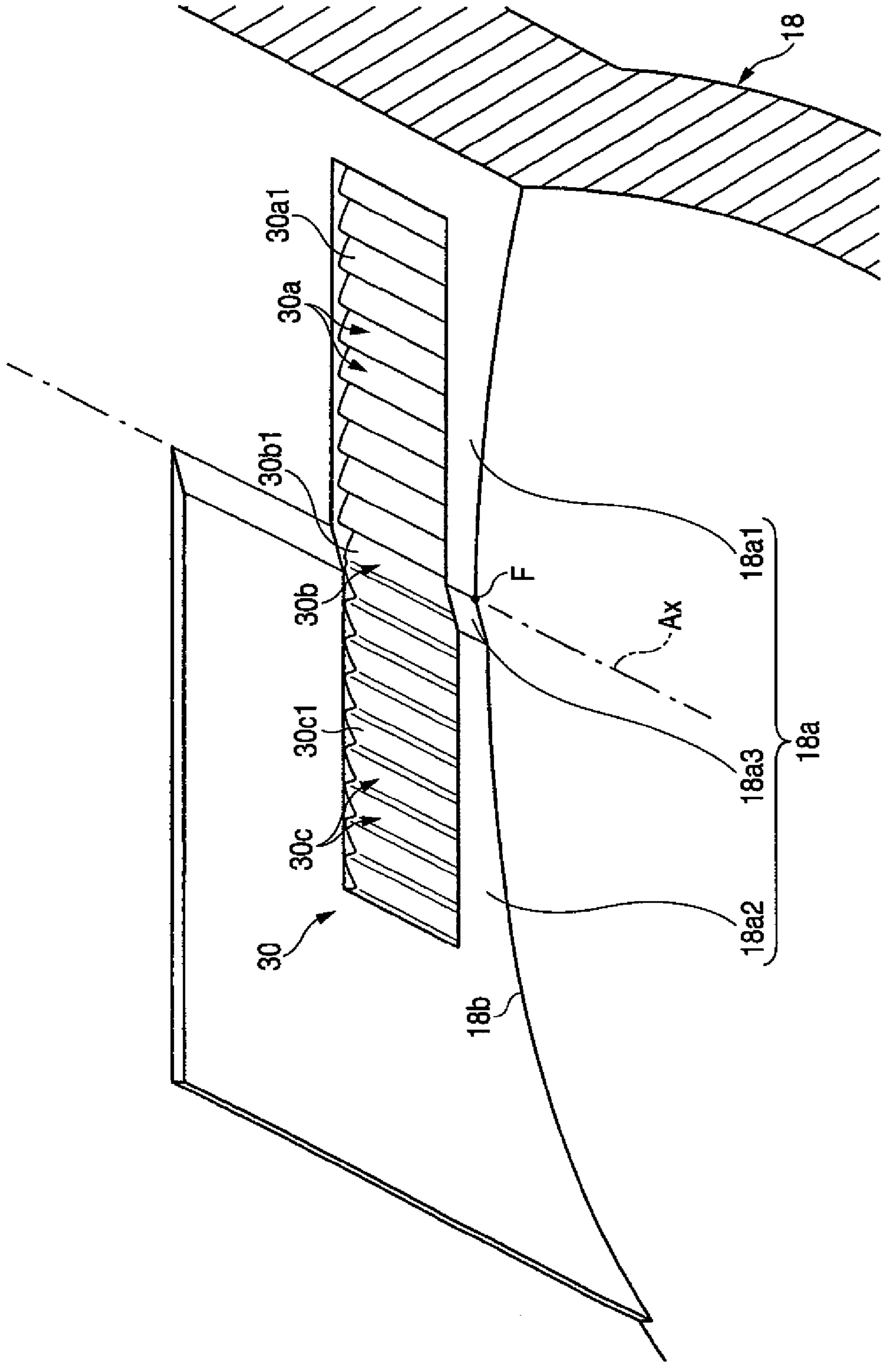
FIG. 5 is a perspective view when the diffusing and reflecting portion of the lamp unit is seen from the oblique upper front left direction.

FIG. 4 is a detailed sectional view taken along the line IV-IV of FIG. 3. Further, FIG. 5 is a perspective view when the diffusing and reflecting portion 30 is seen from the oblique upper front left direction.

As shown in these drawings, the diffusing and reflecting portion 30 is formed so as to extend to the first and second horizontal planes 18*a*1 and 18*a*2 such that it bridges over the middle slope 18*a*3 of the upward reflecting surface 18*a* in the vehicle width direction. Specifically, the diffusing and reflecting portion 30 is formed in a laterally long rectangular region that is 15 to 25 mm (for example, 20 mm) in right-and-left width, and 5 to 10 mm (for example, 7 mm) in front-and-rear width, and the position of the front end edge thereof is set to a position of 1 to 4 mm (for example, 2 mm) from the rear focal point F.

The diffusing and reflecting portion 30 is configured by forming a plurality of grooves 30*a*, 30*b*, and 30*c* extending in the front and rear directions so as to be adjacent to one another in the vehicle width direction. In one or more embodiments, as the plurality of grooves 30*a*, 30*b*, and 30*c*, ten grooves are formed on both sides of the optical axis Ax, respectively, i.e., a total of twenty grooves are formed.

In such a case, ten grooves 30*a* formed on the left side of the optical axis Ax are located in the first horizontal plane 18*a*1, one groove 30*b* formed immediately on the right side of the optical axis Ax is located in the middle slope 18*a*3, and nine grooves 30*c* formed on the right side of the optical axis side are located in the second horizontal plane 18*a*2.

All ten grooves 30*a* are formed in the same cross-sectional shape and are arranged in a substantially serrated shape. Each of the grooves 30*a* has an upward slope (that is, inclined to the side opposite the middle slope 18*a*3) 30*a*1 that is inclined in the upper left direction, and the cross-sectional shape thereof is set in the shape of an upward circular arc. Also, each of the grooves 30*a* is formed so that the upper end edge of the upward slope 30*a*1 thereof may be located slightly below the first horizontal plane 18*a*1.

Because the ten grooves 30*a* are located on the left side of the optical axis Ax, the light from the light-emitting element 14 reflected mainly in the region of the reflecting surface 16*a* of the reflector 16 on the left side of the optical axis Ax will mainly enter each of the grooves 30*a* as rightward slanting light. However, because the upward slope 30*a*1 of each of the grooves 30*a* is inclined in the upper left direction, the light from the reflector 16 reflected by the upward slope 30*a*1 will enter the projection lens 12 positively, irrespective of whether it becomes horizontally diffused light.

On the other hand, the nine grooves 30*c* are formed in the same cross-sectional shape, and are arranged in a substantially serrated shape. Each of the grooves 30*c* has an upward slope (that is, inclined to the side opposite the middle slope 18*a*3) 30*c*1 that is inclined in the upper right direction, and the cross-sectional shape thereof is set in the shape of an upward circular arc. Also, each of the grooves 30*c* is formed so that the upper end edge of the upward slope 30*c*1 may be located slightly below the second horizontal plane 18*a*2.

Because the nine grooves 30*c* are located on the right side of the optical axis Ax, the light from the light-emitting element 1 reflected mainly in a region on the right side of the optical axis Ax in the reflecting surface 16*a* of the reflector 16 will mainly enter each of the grooves 30*c* as leftward slanting light. However, because the upward slope 30*c*1 of each of the grooves 30*c* is inclined in the upper right direction, the light from the reflector 16 reflected by the upward slope 30*c*1 will enter the projection lens 12 positively, irrespective of whether it becomes horizontally diffused light.

The remaining one groove 30*b* has an upward slope (that is, inclined to the side opposite the middle slope 18*a*3) 30*b*1 that is inclined in the upper left direction, and the cross-sectional shape thereof is set in the shape of an upward circular arc. Also, the groove 30*b* is formed so that the upper end edge of the upward slope 30*b*1 thereof may be located slightly below the second horizontal plane 18*a*2.

Because the groove 30*b* is in the position adjacent to the right side of the optical axis Ax, the light from the light-emitting element 14 in a region in the vicinity of the right side of the optical axis Ax in the reflecting surface 16*a* of the reflector 16 enters the groove 30*b* as the light substantially parallel to the optical axis Ax in plan view. However, because the upward slope 30*b*1 of the groove 30*b* is inclined in the upper left direction, the light from the reflector 16 reflected by upward slope 30*b*1 becomes the light that is diffused in the horizontal direction slightly to the left, and the light will enter the projection lens 12, and will be emitted forward from the projection lens 12 as the light that is diffused in the horizontal direction slightly to the right.

Figure 6:
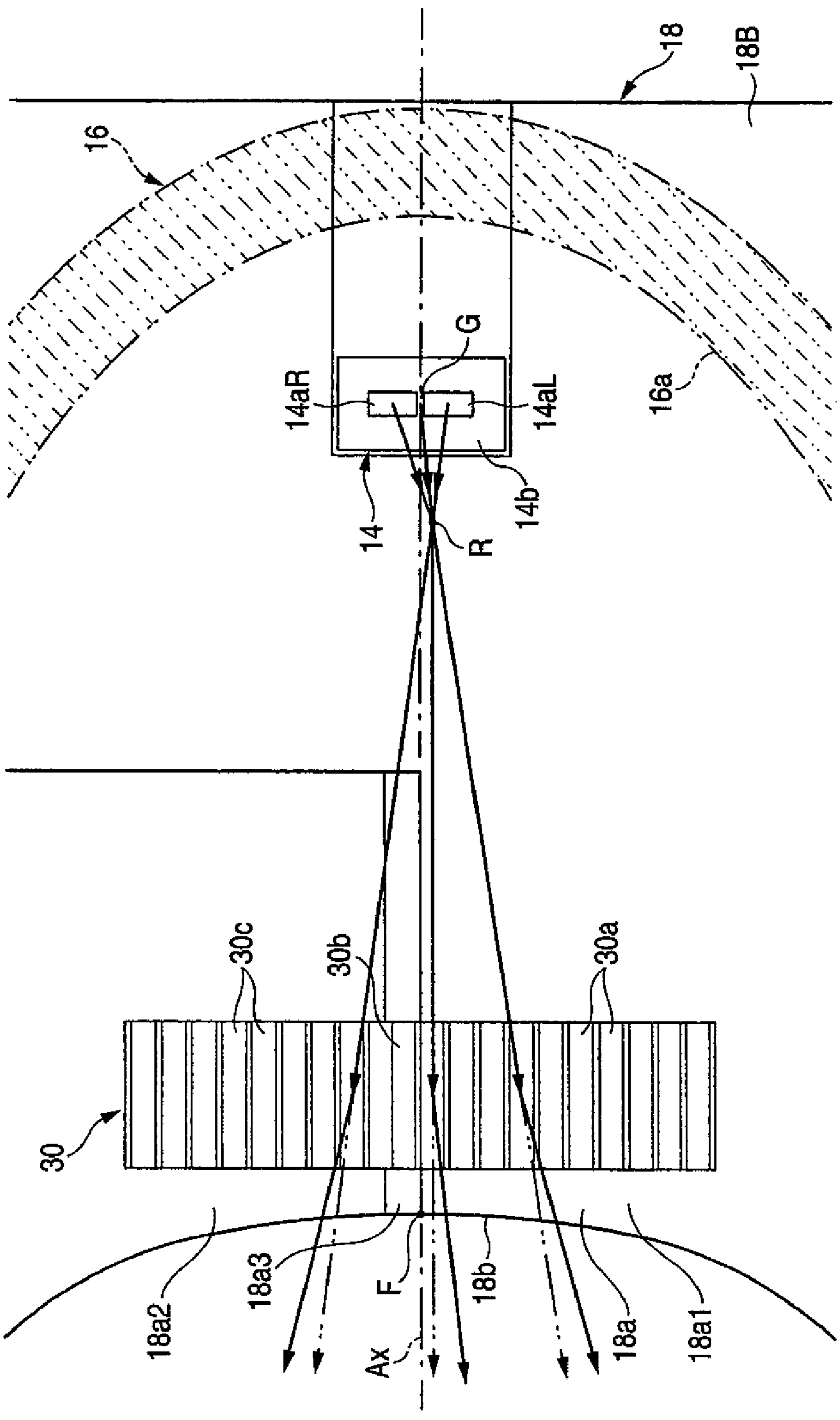
FIG. 6 is a detailed view of chief parts of FIG. 3.

FIG. 6 is a detailed view of chief parts of FIG. 3, and a view showing that the light from the light-emitting element 14 that is reflected at a point R located in a central reflection region close to and just above the optical axis Ax in the reflecting surface 16*a* of the reflector 16, and enters the diffusing and reflecting portion 30 is picked up.

As shown in this drawing, although the point R is displaced slightly to the left from just above the optical axis Ax, the light from the light-emitting element 14 reflected at this point will be totally reflected in a direction substantially parallel to the optical axis Ax in plan view.

Because the pair of light-emitting chips 14*a*L and 14*a*R in the light-emitting element 14 are displaced in the vehicle width direction with respect to the optical axis Ax, the light from the light-emitting chip 14*a*L located on the left side of the optical axis Ax is reflected at the point RF, advances rightward, and enters the grooves 30*c* located on the right side of the optical axis Ax. On the other hand, the light from the light-emitting chip 14*a*R located on the right side of the optical axis Ax is reflected at the point R, advances leftward, and enters the grooves 30*a* located on the left side of the optical axis Ax. Also, the virtual light from the point on the optical axis Ax located in the gap G between both the light-emitting chips 14*a*L and 14*a*R is reflected at the point R, advances substantially along the optical axis Ax, and enters the grooves 30*a* adjacent to the left side of the optical axis Ax.

In such a case, if the diffusing and reflecting portion 30 is not formed in the upward reflecting surface 18*a*, as indicated by two-dot chain lines, the virtual light from the gap G between both the light-emitting chips 14*a*L and 14*a*R is regularly reflected by the first horizontal plane 18*a*1 of the upward reflecting surface 18*a*, and advances substantially along the optical axis Ax as it is, the light from the left light-emitting chip 14*a*L is regularly reflected by the second horizontal plane 18*a*2 of the upward reflecting surface 18*a*, and advances rightward, and the light from the right light-emitting chip 14*a*R is regularly reflected by the first horizontal plane 18*a*1 of the upward reflecting surface 18*a*, and advances leftward.

Because the diffusing and reflecting portion 30 is actually formed, the virtual light from the gap G between both the light-emitting chips 14*a*L and 14*a*R is diffused and reflected to the left by the grooves 30*a*, the light from the left light-emitting chip 14*a*L is diffused and reflected to the right by the grooves 30*c*, and the light from the right light-emitting chip 14*a*R is diffused and reflected to the left by the grooves 30*a*.

Figure 7:
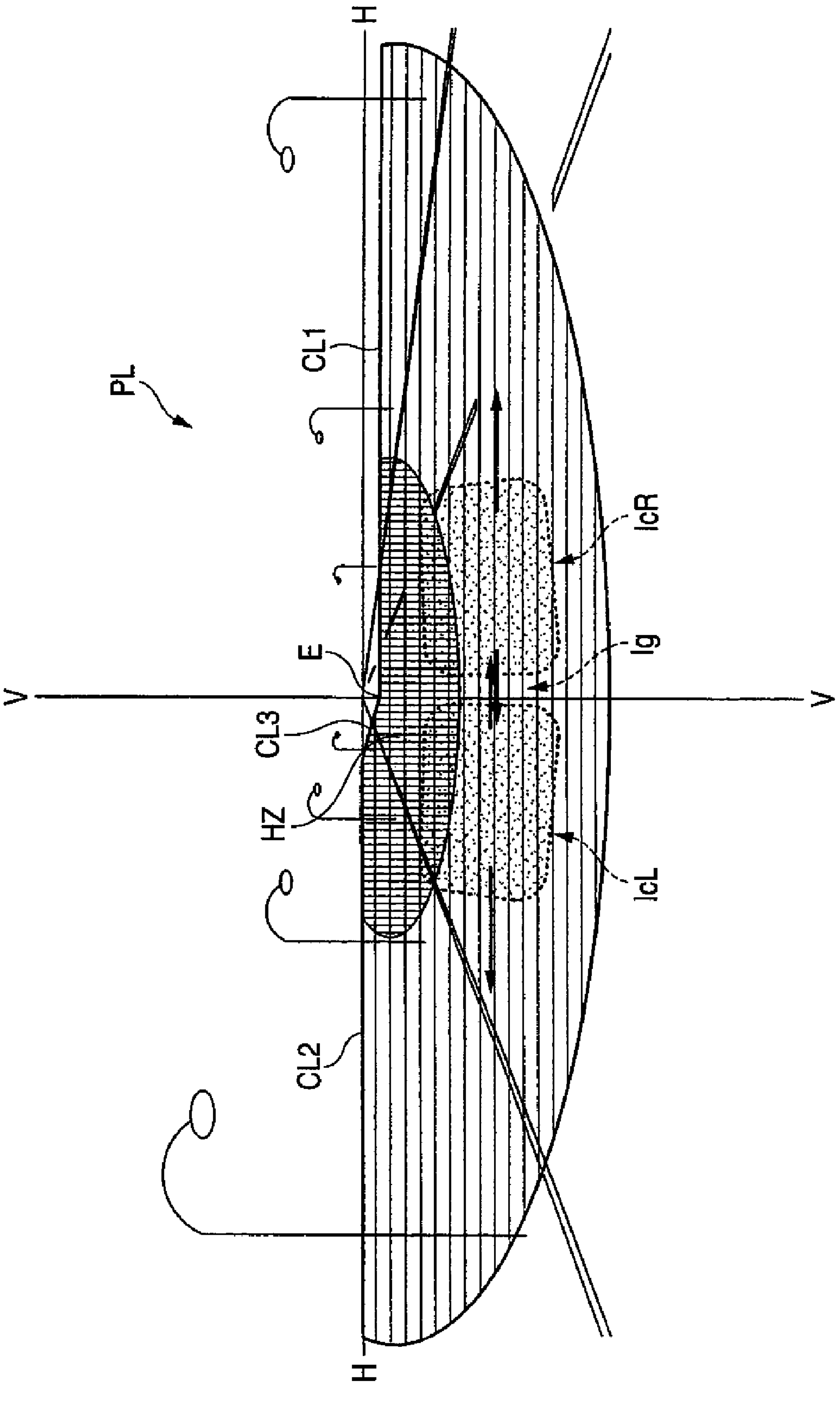
FIG. 7 is a perspective view showing a light distribution pattern for low beams formed on a virtual vertical screen, which is arranged in the position of 25 m ahead of a vehicle, by the light radiated forward from the lamp unit.

FIG. 7 is a perspective view showing a light distribution pattern PL for low beams formed on a virtual vertical screen, which is arranged in the position of 25 m ahead of a vehicle, by the light radiated forward from the lamp unit 10 according to one or more embodiments. As shown in this drawing, the light distribution pattern PL for low beams is a light distribution pattern for low beams of left light distribution, and has cut-off lines CL1, CL2, and CL3 with a right-and-left height difference at its upper end edge.

The cut-off lines CL1, CL2, and CL3 extend in the horizontal direction with a right-and-left height difference, with the line V-V that is a vertical line that passes through H-V that is a vanishing point ahead of the lamp as a borderline. On the right side of the line V-V, the cut-off line CL1 on the side of the opposite lane is formed so as to extend in the horizontal direction, and on the left side of the line V-V, the cut-off line CL2 on the side of the self-lane is formed so as to extend in the horizontal direction such that it is one-step higher than the cut-off line CL1 on the side of the opposite lane. Also, the end of the self-lane cut cut-off line CL2 nearer the line V-V is formed as an oblique cut-off line CL3. The oblique cut-off line CL3 extends at an inclination angle of 15° obliquely in the upper left direction from the point of intersection between the opposite-lane cut-off line CL1 and the line V-V.

In this light distribution pattern P for low beams, an elbow point E that is a point of intersection between the lower-stage cut-off line CL1 and the line V-V is located about 0.5 to 0.60 below H-V. This is because the optical axis Ax extends in a downward inclined direction of about 0.5 to 0.6° with respect to the longitudinal direction of a vehicle. Also, in this light distribution pattern PL for low beams, a hot zone HZ that is a high luminous-intensity region is formed so as to surround the elbow point E.

The light distribution pattern PL for low beams is formed by projecting an image of the light-emitting element 14, which is formed on the rear focal plane of the projection lens 12 by the light from the light-emitting element 14 reflected by the reflector 16, as an inverted projection image onto the above virtual vertical screen by means of the projection lens 12, and the cut-off lines CL1, CL2, and CL3 are formed as an inverted projection image of the front end edge 18*b* of the upward reflecting surface 18*a* of the mirror member 18.

In such a case, the light distribution pattern PL for low beams is a combined light pattern of a light distribution pattern formed by the light that has directly entered a lower region of the projection lens 12 in the light from the light-emitting element 14 reflected by the reflecting surface 16*a* of the reflector 16, and a light distribution pattern formed by the light that has entered an upper region of the projection lens 12 after being reflected by the upward reflecting surface 18*a* of the mirror member 18.

In this drawing, a pair of light source images IcL and IcR indicated by broken lines are light source image formed by the light from the pair of light-emitting chips 14*a*L and 14*a*R that is reflected at the point R of the central reflection region in the reflecting surface 16*a* of the reflector 16, and enters the upward reflecting surface 16*a* of the mirror member 18. The pair of light source images IcL and IcR are light source images formed when the diffusing and reflecting portion 30 is not formed in the upward reflecting surface 18*a*.

Because the point R is displaced slightly to the left from just above the optical axis Ax, the pair of light source images IcL and IcR are not arranged bilaterally symmetrical with respect to the line V-V, but displaced slightly to the right. Between the pair of light source images IcL and IcR, an image Ig of the gap G between both the light-emitting chips 14*a*L and 14*a*R question is formed. Since the image Ig of the gap G is formed as a dark portion, light distribution unevenness will be caused in a short-distance region in the frontal direction of a vehicle in a road surface ahead of the vehicle.

However, in the lamp unit 10 according to one or more embodiments, the diffusing and reflecting portion 30 is formed in the upward reflecting surface 18*a* of the mirror member 18. Thus, occurrence of the above light distribution unevenness will be suppressed.

That is, because the light from the left light-emitting chip 14*a*L is diffused and reflected to the right by the grooves 30*c* of the diffusing and reflecting portion 30, and the light from the right light-emitting chip 14*a*R is diffused and reflected to the left by the grooves 30*a* of the diffusing and reflecting portion 30, the light source image of the left light-emitting chip 14*a*L widens largely leftward, and widens small rightward, and the light source image of the right light-emitting chip 14*a*R widens largely rightward, and widens small leftward. Accordingly, as for the light source images of both light-emitting chips 14*a*L and 14*a*R, the image Ig of the gap G between both the light-emitting chips 14*a*L and 14*a*R is blocked, thereby making a dark portion disappear.

Moreover, a portion of the light from the left light-emitting chip 14*a*L enters the groove 30*b* in the position adjacent to the right side of the optical axis Ax, and is diffused and reflected to the left by the groove 30*b*, after being reflected at the point R of the reflecting surface 16*a* of the reflector 16. Thus, a portion of the light source image of the left light-emitting chip 14*a*L widens largely rightward, and widens small leftward. Accordingly, the image Ig of the gap G between both the light-emitting chips 14*a*L and 14*a*R is blocked positively.

Accordingly, because the gap G between both the light-emitting chips 14*a*L and 14*a*R is prevented from being projected as a longitudinally striped dark portion, light distribution unevenness of a short-distance region in the frontal direction of a vehicle on a road surface ahead of the vehicle is reduced.

As described in detail above, the lamp unit 10 of a vehicle headlamp according to one or more embodiments is constituted as a projector-type lamp unit 10 that uses the light-emitting element 14 as a light source. However, the mirror member 18 that has the upward reflecting surface 18*a* that upward reflects a portion of the reflected light from the reflector 16, and that is formed so that the front end edge 18*b* of the upward reflecting surface 18*a* may pass through the rear focal point F of the projection lens 12 is provided between the reflector 16 and the projection lens 12. Thus, it is possible to form the light distribution pattern P1 for low beams that has clear cut-off lines CL1, CL2, and CL3 at its upper end, as well as it is possible to enhance the utilization efficiency of the light from the light-emitting element 14.

Further, because the light-emitting element 14 includes the pair of light-emitting chips 14*a*L, and 14*a*R, the light-source luminous flux of the light-emitting element 14 can be increased, and, thereby the brightness of the light distribution pattern PL for low beams can be ensured sufficiently.

In such a case, because the pair of light-emitting chips 14*a*L and 14*a*R are arranged so as to be adjacent to each other in the vehicle width direction, the light source images IcL and IcR formed by the reflected light from the point R of the central reflection region close to and just above the optical axis Ax in the reflecting surface 16*a* of the reflector 16 has a dark portion as the image Ig of the gap G between the light-emitting chips 14*a*L and 14*a*R. However, because the diffusing and reflecting portion that diffuses and reflects the reflected light from the reflector 16 is formed in the upward reflecting surface 18*a* of the mirror member 18 so as to bridge over the optical axis Ax in the vehicle width direction, a light source image formed by the light from the central reflection region of the reflector 16 reflected by the diffusing and reflecting portion 30 can block the gap G between both the light-emitting chips 14*a*L and 14*a*R, thereby preventing the gap G from being projected as a longitudinally striped dark portion. Because of this, light distribution unevenness can be suppressed in the light distribution pattern PL for low beams.

As described above, according to one or more embodiments, when a projector-type lamp unit that uses the light-emitting element 14 as a light source is adopted as the lamp unit 10 of a vehicle headlamp, occurrence of light distribution unevenness can be suppressed irrespective of whether the light-emitting element 14 is configured to have one pair of light-emitting chips 14*a*L and 14*a*R arranged so as to be adjacent to each other in the vehicle width direction.

Moreover, in one or more embodiments, the diffusing and reflecting portion 30 is configured by forming a plurality of grooves 30*a*, 30*b*, and 30*c* extending in the front and rear directions so as to be adjacent to one another in the vehicle width direction. Thus, the reflected light from each of the grooves 30*a*, 30*b*, and 30*c* can be made into horizontally diffused light. Because of this, a light distribution pattern formed by the reflected light from the central reflection region of the reflector 16 reflected by the diffusing and reflecting portion 30 can be made into a laterally long light distribution pattern. This makes it possible to more effectively suppress occurrence of light distribution unevenness.

Because the grooves 30*a* and 30*c* among the plurality of grooves 30*a*, 30*b*, and 30*c* that are in positions apart from the optical axis Ax have the upward slopes 30*a*1 and 30*c*1 whose height becomes gradually small toward directions away from the optical axis Ax, the following operation effects can be obtained.

Because the reflected light from the reflector 16 becomes the light that is directed toward a direction nearer the optical axis Ax, the reflected light from the left reflection region of the reflector 16 will enter mainly the grooves 30*a* located on the left side of the optical axis Ax, and the reflected light from the right reflection region of the reflector will enter mainly the grooves 30*b* and 30*c* located on the right side of the optical axis Ax. Thus, by constituting the grooves 30*a* and 30*c* among the plurality of grooves 30*a*, 30*b*, and 30*c* that are in positions apart from the optical axis Ax with the upward slopes 30*a*1 and 30*c*1 whose height becomes gradually small toward directions away from the optical axis Ax, the reflected light of each of the grooves 30*a* and 30*c* can be made to enter the projection lens 12 irrespective of whether the reflected light becomes horizontally diffused light. Accordingly, the luminous flux of a light source can be utilized effectively.

Further, in one or more embodiments, the groove 30*b* in a position adjacent to the right side of the optical axis Ax has the upward slope 30*b*1 whose height becomes gradually large toward directions away from the optical axis Ax. Thus, the following operation effects can be obtained.

A portion of the light from the left light-emitting chip 14*a*L also enters the groove 30*b* in the position adjacent to the right side of the optical axis Ax, and is diffused and reflected to the left by the groove 30*b*, after being reflected at the point R of the reflecting surface 16*a* of the reflector 16. Thus, a portion of the light source image of the left light-emitting chip 14*a*L widens largely rightward, and widens small leftward. Accordingly, the image Ig of the gap G between both the light-emitting chips 14$a$L and 14$a$R can be blocked positively, and thereby occurrence of light distribution unevenness can be suppressed more effectively.

Further, in one or more embodiments, the position of the front end edge of the diffusing and reflecting portion 30 is further set to the position of 1 to 4 mm from the rear focal point F of the projection lens 12. Thus, the light that is directed to a relatively short-distance region (that is, a region where light distribution unevenness is conspicuous) in the frontal direction of a vehicle can be diffused, and thereby, occurrence of light distribution unevenness can be suppressed effectively. Further, since the portion of the upward defecting surface 18$a$ located in front of the diffusing and reflecting portion 30 ensures the function as the upward deflecting surface 18$a$, the cut-off lines CL1, CL2, and CL3 formed from the front end edge 18$b$ of the upward reflecting surface 18$a$ can be formed clearly.

Further, in one or more embodiments, the pair of light-emitting chips 14$a$L and 14$a$R having a rectangular light-emitting surface with a size of about 1 mm×2 mm, are arranged so as to be adjacent to each other in the vehicle width direction such that short side portions thereof face each other. Thus, it is possible to make the pair of light source images IcL and IcR into laterally long light source images suitable for formation of the light distribution pattern PL for low beams.

In addition, although the description of the above embodiments has been made with respect to the case where the light-emitting chips 14$a$L and 14$a$R of the light-emitting element 14 have a rectangular light-emitting surface of 1 mm×2 mm, a configuration which the light-emitting chips have a light-emitting surface of other shapes or sizes than the above ones can also be adopted, and three or more light-emitting chips can also be arranged adjacent to one another in the vehicle width direction.

Further, although the description of the above embodiments has been made with respect to the lamp unit 10 that is configured so as to form the light distribution pattern PL of left light distribution having the cut-off lines CL1, CL2, and CL3 with a right-and-left height difference, the same operation effects as those of the above embodiment can be obtained by adopting the same configuration as that of the above embodiment even in a lamp unit that is configured so as to form a light distribution pattern for low beams having a horizontal cut-off line and an oblique cut-off line, a lamp unit that is configured so as to form a light distribution pattern for low beams having only a horizontal cut-off line, or a lamp unit that is configured so as to form a light distribution pattern for low beams of right light distribution.

Moreover, in the lamp unit 10 according to the above embodiments, the front end edge 18$b$ of the upward reflecting surface 18$a$ in the mirror member 18 is formed so as to extend along the rear focal plane of the projection lens 12 in order to form a low distribution patter for low beams. However, when a light distribution pattern for high beams, etc. is formed, the position of the front end edge of the upward reflecting surface 18$a$ can be positioned behind the position of the front end edge 18$b$ of the above embodiments.

Moreover, although the description of the above embodiments has been made with respect to the case where the upward reflecting surface 18$a$ is formed so as to rearward extend along the optical axes Ax from the position of the rear focal point F, it is also possible to adopt a configuration in which the upward reflecting surface 18$a$ is formed in a slightly (for example, about 1.5°) front lower direction with respect to the longitudinal direction of a vehicle. By adopting such a configuration, a mold can be easily extracted when the mirror member 18 is molded, and more of the reflected light from the reflector 16 reflected by the upward reflecting surface 18$a$ can be made to enter the projection lens 12.

In addition, the numeric values shown as dimensional data in the above embodiment are just illustrative, and it is natural that the values may be set to suitably different values.

While description has been made in connection with embodiments of the present invention, it will be obvious to those skilled in the art that various changes and modification may be made therein without departing from the present invention.

It is aimed, therefore, to cover in the appended claims all such changes and modifications falling within the true spirit and scope of the present invention.

Reference Numerals

10: LAMP UNIT
12: PROJECTION LENS
14: LIGHT-EMITTING ELEMENT
14$a$L, 14$a$R: LIGHT-EMITTING CHIP
14$b$: SUBSTRATE
16: REFLECTOR
16$a$: REFLECTING SURFACE
18: MIRROR MEMBER
18A: LENS HOLDER
18B: REAR EXTENSION PORTION
18$a$: UPWARD REFLECTING SURFACE
18$a$1: FIRST HORIZONTAL PLANE
18$a$2: SECOND HORIZONTAL PLANE
18$a$3: MIDDLE SLOPE
18$b$: FRONT END EDGE
30: DIFFUSING AND REFLECTING ELEMENT
30$a$, 30$b$, 30$c$: GROOVE
30$a$1, 30$b$1, 30$c$1: UPWARD SLOPE
Ax: OPTICAL AXIS
CL1: OPPOSITE-LANE CUT-OFF LINE
CL2: SELF-LANE CUT-OFF LINE
CL3: OBLIQUE CUT-OFF LINE
E: ELBOW POINT
F: REAR FOCAL POINT
G: GAP
HZ: HOT ZONE
IcL, IcR: LIGHT SOURCE IMAGE
Ig: IMAGE OF GAP
P1, P2, P3: LIGHT DISTRIBUTION PATTERN
PL: LIGHT DISTRIBUTION PATTERN FOR LOW BEAMS
R: POINT LOCATED IN CENTRAL REFLECTION REGION

What is claimed is:

1. A lamp unit of a vehicle lamp comprising:

a projection lens disposed on an optical axis extending in a longitudinal direction of a vehicle;

a light-emitting element disposed near the optical axis so as to face upward behind a rear focal point of the projection lens, the light-emitting element comprising a plurality of light-emitting chips disposed adjacent to each other in a vehicle width direction;

a reflector disposed so as to cover the light-emitting element from above and to reflect light from the light-emitting element forward toward the optical axis;

a mirror member provided between the reflector and the projection lens, the mirror member comprising an upward reflecting surface that upward reflects a portion of the reflected light from the reflector; and a diffusing and reflecting portion that diffuses and reflects the reflected light from the reflector and is formed in the upward reflecting surface so as to bridge over the optical axis in the vehicle width direction, wherein the diffusing and reflecting portion comprises a plurality of grooves extending in the longitudinal direction so as to be adjacent to one another in the vehicle width direction.

2. The lamp unit of a vehicle headlamp according to claim 1, wherein each of the grooves among the plurality of grooves that are in positions apart from the optical axis has an upward slope whose height becomes gradually small toward a direction away from the optical axis.

3. The lamp unit of a vehicle headlamp according to claim 1, wherein a position of a front end edge of the diffusing and reflecting portion is set to a position of 1 to 4 mm from the rear focal point of the projection lens.

4. The lamp unit of a vehicle headlamp according to claim 2, wherein a position of a front end edge of the diffusing and reflecting portion is set to a position of 1 to 4 mm from the rear focal point of the projection lens.

5. A method of manufacturing a lamp unit of a vehicle lamp comprising:

disposing a projection lens on an optical axis extending in the longitudinal direction of a vehicle, disposing a light-emitting element near the optical axis so as to face upward behind a rear focal point of the projection lens, the light-emitting element comprising a plurality of light-emitting chips disposed adjacent to each other in a vehicle width direction, covering the light-emitting element from above with a reflector that reflects light from the light-emitting element forward toward the optical axis, disposing a mirror member between the reflector and the projection lens, the mirror member comprising an upward reflecting surface that upward reflects a portion of the reflected light from the reflector, and forming a diffusing and reflecting portion that diffuses and reflects the reflected light from the reflector in the upward reflecting surface so as to bridge over the optical axis in the vehicle width direction, wherein the diffusing and reflecting portion comprises a plurality of grooves extending in the longitudinal direction so as to be adjacent to one another in the vehicle width direction.

6. The method according to claim 5, wherein each of the grooves among the plurality of grooves that are in positions apart from the optical axis has an upward slope whose height becomes gradually small toward a direction away from the optical axis.

7. The method according to claim 5, further comprising:

setting a position of the front end edge of the diffusing and reflecting portion to a position of 1 to 4 mm from the rear focal point of the projection lens.

8. A lamp unit of a vehicle lamp comprising:

a projection lens disposed on an optical axis extending in a longitudinal direction of a vehicle;

a light-emitting element disposed near the optical axis so as to face upward behind a rear focal point of the projection lens, the light-emitting element comprising a plurality of light-emitting chips disposed adjacent to each other in a vehicle width direction;

a reflector disposed so as to cover the light-emitting element from above and to reflect light from the light-emitting element forward toward the optical axis;

a mirror member provided between the reflector and the projection lens, the mirror member comprising an upward reflecting surface that upward reflects a portion of the reflected light from the reflector; and a diffusing and reflecting portion that diffuses and reflects the reflected light from the reflector and is formed in the upward reflecting surface so as to bridge over the optical axis in the vehicle width direction, wherein a position of a front end edge of the diffusing and reflecting portion is set to a position of 1 to 4 mm from the rear focal point of the projection lens.

* * * * *